Nov. 19, 1957    C. E. HALL    2,813,655
EXPANSIBLE TANK REINFORCING RING
Filed Aug. 22, 1955
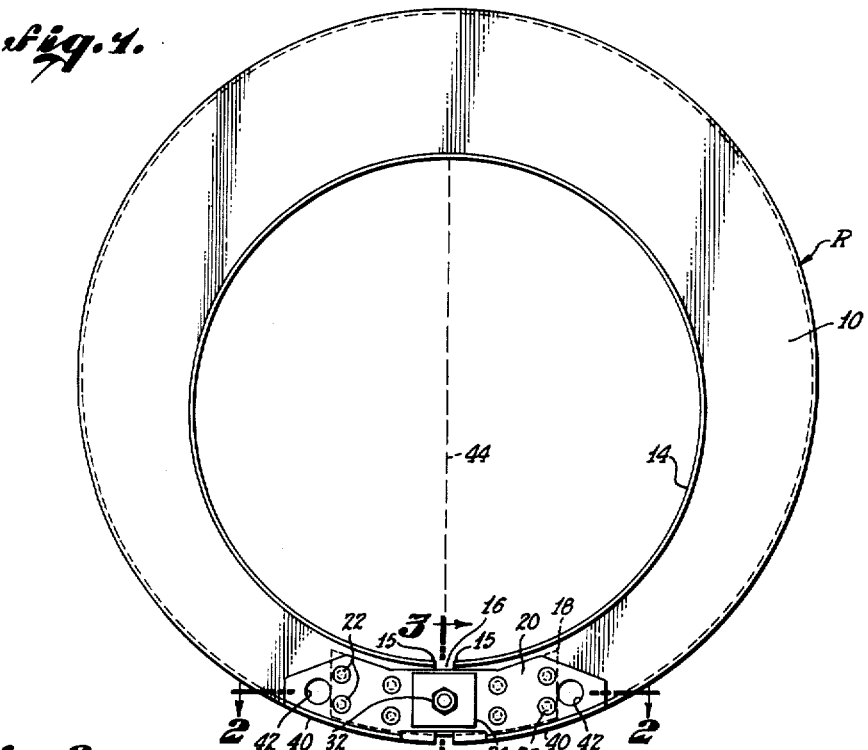
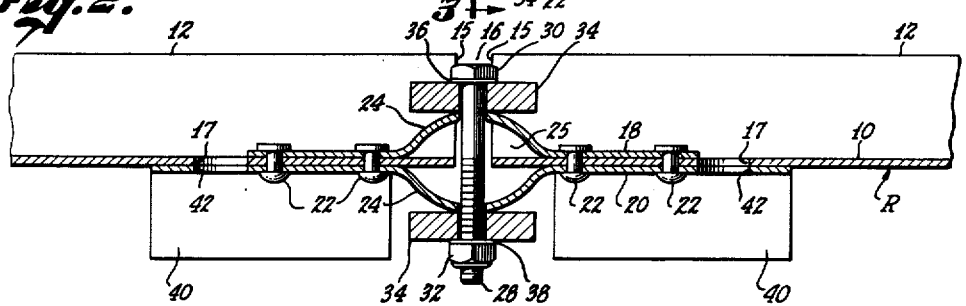
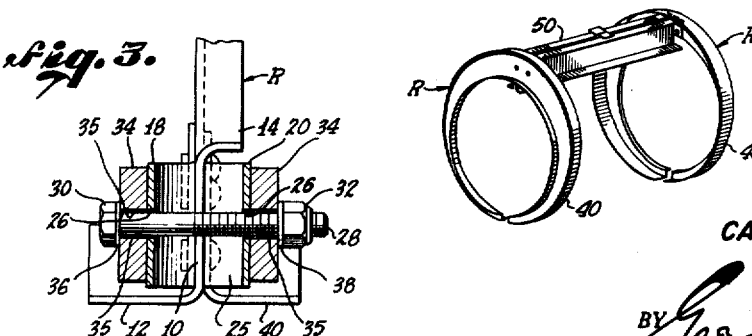
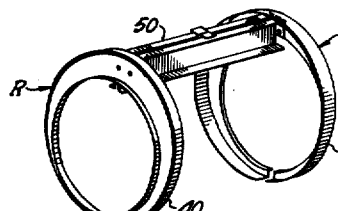
CARL E. HALL,
INVENTOR.
BY
ATTORNEY.

2,813,655
Patented Nov. 19, 1957

2,813,655

EXPANSIBLE TANK REINFORCING RING

Carl E. Hall, Los Angeles, Calif., assignor to Pastushin Aviation Corporation, Los Angeles, Calif., a corporation Application August 22, 1955, Serial No. 529,757

10 Claims. (Cl. 220—71)

This invention relates to reinforcement structures for the interior of tanks and the like, with special reference to reinforcement structures incorporating reinforcement rings, and the invention is directed to the combination with such a ring of means to expand the ring against the surrounding shell of a tank. While the invention is broadly applicable for its purpose, it has special utility for use in the construction of an auxiliary jettisonable fuel tank for military aircraft, which fuel tank is designed for assembly in the field. This particular application of the invention as described herein will provide adequate guidance to those skilled in the art who may have occasion to apply the same principles to other particular purposes.

Auxiliary fuel tanks of the type that are intended to be jettisoned in flight are commonly shipped to the point of use in dismantled state with parts of the dismantled tanks nested for reduction in shipping space. At the point of use, the task of assembling the tank includes the installation of some kind of internal reinforcement structure inside the tank shell, which structure comprises one or more internal rings or bulkhead members.

It is highly desirable to have such a reinforcement structure so constructed that it may be assembled by a simplified procedure without necessity for special jigs or other special auxiliary equipment and without necessity of any special tools. A feature of the invention in this regard is that it incorporates into the ring structure means for expanding the ring by means of simple hand tools. In the preferred practice of the invention, the ring is expanded by a simple screw means that may be operated by commonly available types of wrenches.

In accord with the invention, the reinforcement structure includes a split internal reinforcement ring for inside the tank shell, which ring has an initial diametrical dimension small enough to permit the ring to be inserted into the shell. The two ends of the split ring are interconnected by at least one plate or metal strap that is bowed between its points of connection with the two ring ends. When the ring is properly positioned inside the tank shell, the bowed portion of the interconnecting plate is flattened to sufficient extent to expand the ring to the required diametrical dimension for effectively reinforcing the surrounding shell. In the preferred practice of the invention, two oppositely bowed plates are utilized for this purpose across the split in the reinforcing ring.

An important advantage of this concept of straightening a bowed interconnecting plate for spreading the two ends of the split ring apart is that the ratio between the resultant force and the applied force increases in substantially the manner that is characteristic of a toggle linkage. Thus as the ultimate desired radial pressure by the ring against the surrounding tank shell is approached with consequent rise in the resistance to the expansion force, the effectiveness of the applied force increases to meet the rise. In this respect the invention has an important advantage over a turnbuckle arrangement, for example, in which no such increase in this ratio occurs.

A further advantage of the use of a bowed interconnecting plate in this manner for the expansion of a reinforcement ring is that the bow may be so dimensioned that when it is completely flattened the ring will be expanded precisely to a desired diametrical dimension. Thus, the bow may be shaped and dimensioned for precise predetermination of the expanded diametrical dimension of the split ring. Here again the invention is advantageous over a turnbuckle arrangement for expanding such a split ring.

Another feature of the preferred practice of the invention is that the reinforcement ring is so constructed that the greatest outward pressure of the ring in response to the expansion force occurs in the region of the two ends. For this purpose, the ring may be of any suitable construction that results in decreased radial rigidity at the ring ends. In the preferred practice of the invention, for example, the ring has a radial web that is generally crescent shaped in configuration with the greatest radial dimension in the region diametrically opposite from the split in the ring end with the radial dimension progressively decreasing from this central region to each end of the ring.

An important object of the invention is attained by constructing split ring in this manner for inherent maximum flexural response at its two ends. This object is to cause the initial expansion of the ring to be localized or concentrated so that the ring makes immediate frictional engagement with the shell, the initial expansion being on the diameter on which the split in the ring is located.

In many instances, the cross-sectional configuration of the ring is such that the application of a spreading force between the two split ends of the ring creates a strong tendency for the ring to twist or rotate laterally, especially in the region of the two ends. Thus if a reinforcement ring has a radial web with an outer circumferential flange extending in only one direction laterally of the web and the expansion force is applied directly to the two ends of the web, the ring will inevitably twist locally in response to the expansion force. This twisting tendency is always troublesome in a sheet metal ring that is either U-shaped or Z-shaped in cross-sectional configuration.

The invention has special utility in a well-known internal reinforcement structure that includes two interconnected expansible reinforcement rings. In the usual construction, the two rings are interconnected by a first longitudinal member that is attached to the mid-points of the two rings and are further interconnected by a second longitudinal member in the region of the split ends of the rings. In the construction of a jettisonable fuel tank, the primary purpose of the first longitudinal is to receive the force for ejecting the tank from the airplane in flight and to distribute this force to the two rings; and the primary purpose of the second longitudinal is to resist the tendency of the two rings to twist in the region of the splits in response to the ring-expanding forces.

In this regard, a feature of the preferred practice of the present invention is the provision of additional flanges to serve the purpose of preventing local twist on the part of the two split rings thereby eliminating the necessity for the second longitudinal in the two-ring reinforcement structure. Preferably these additional flanges are provided by the bowed plates. Thus where a reinforcement ring with a radial web has an outer circumferential flange that extends in one direction laterally of the web, an interconnecting bowed plate for spreading the split ends of the ring may be provided with flanges on each side of ring split, which flanges are on the same circumference as the ring flange but extend in the opposite lateral direction. A further advantage of providing such flanges is that the tendency of the ring to twist locally in the region of the ring split is further discouraged by the inherent tendency of the crescent shaped ring to create maximum radial pressure against the tank shell on the diameter of the ring split where the added flanges are located.

The various features and advantages of the invention may be understood from the following detailed description taken with the accompanying drawing.

In the drawing, which is to be regarded as merely illustrative:

Figure 1 is a face elevational view of an expansible reinforcement ring embodying the presently preferred practice of the invention;

Figure 2 is an enlarged fragmentary sectional view taken as indicated by the line 2—2 of Figure 1 showing the two bowed plates as shaped prior to the expansion operation;

Figure 3 is a fragmentary section on the same scale taken as indicated by the line 3—3 of Figure 1; and Figure 4 is a perspective view on a greatly reduced scale showing a two-ring reinforcement structure that may be used in a jettisonable fuel tank.

Figure 1 shows a split ring, generally designated R, that may be used, for example, as a bulkhead ring for internal reinforcement of a jettisonable auxiliary fuel tank for aircraft. As may be seen in Figures 1 and 3, this particular split ring is of what may be termed Z-shaped cross-sectional configuration. Thus the split ring is made of a single piece of sheet material to form a radial web 10, an outer circumferential flange 12 and an inner circumferential flange 14. By virtue of the split construction, the ring has two adjacent ends 15 which, in this instance, are initially spaced apart to form a gap 16. In the construction shown, the split ring is provided with a pair of openings 17 spaced on opposite sides of the gap 16 to permit free fluid drainage across the ring. The diametrical dimension of the ring R with this gap 16 is sufficiently small to permit the ring to be inserted into the interior of a tank shell that is intended to be internally reinforced by the ring.

In accord with the invention, two plates or straps 18 and 20 bridge the gap 16 on opposite faces of the ring web 10, the end portions of the two plates being suitably connected to the ring ends 15, for example, by means of suitable rivets 22. The central or intermediate portions of the two plates 18 and 20 are formed with opposite bows 24 which are positioned face to face to define a generally elliptical space 25.

The bowed portions 24 of the two plates have aligned apertures or bores 26 through which extends a suitable screw means 28 in the form of a screw or bolt for the purpose of flattening the bows thereby to expand the split ring. For this purpose, the screw means 28 is formed with a hexagonal head 30 at one end and carries a hexagonal nut 32 at the other end. Preferably, pressure members in the form of thick plates or blocks 34 are positioned respectively on the outer sides of the two bows 24, these blocks having aligned apertures or bores 35 to receive the screw means 28. In the arrangement shown, a washer 36 is interpositioned between the head 30 and one of the pressure blocks 34 and a similar washer 38 is interpositioned between the nut 32 and the other pressure block.

In this embodiment of the invention the bowed plate 20 on the side of the web 10 opposite from the circumferential flange 12 of the ring is formed with arcuate flanges 40 on the opposite sides of the ring gap 16, these two flanges 40 extending arcuately along the same circumference as the outer ring flange 12. For this purpose, the bowed plate 20 may be longer than the bowed plate 18 to extend beyond each of the openings 17 in the ring web 10, the bowed plate being provided with openings 42 that register with the openings 18.

As heretofore indicated, a feature of the preferred practice of the invention is that the web 10 of the split ring R is somewhat crescent-shaped in general configuration. Thus the point of maximum radial dimension of the web 10 is at the mid-point of the ring on the diameter indicated by the dotted line 44 that passes through the gap 16. From this mid-point of maximum radial dimension, the ring tapers progressively in radial dimension to the two ring ends 15. It is apparent that by virtue of this tapered configuration the rigidity of the ring with respect to radial outward flexure decreases progressively from the mid-point to the two ring ends 15.

The manner in which the described ring assembly serves its purpose may be readily understood from the foregoing description. At the initial contracted configuration of the ring shown in the drawing, the ring is small enough in diametrical dimension to be readily inserted into a tank shell that is to be reinforced by the ring. When the ring is in the desired reinforcing position, suitable wrench means is employed to tighten the nut 32 to draw the two pressure blocks 34 towards each other, thereby to flatten the two bows 24 of the connecting plates 18 and 20. Preferably, but not necessarily, the bows 24 are precisely shaped and dimensioned to expand the ring to the desired degree when the bows are completely flattened by the two pressure blocks 34. Thus in the installation of the ring inside a tank shell, the nut 32 is tightened to flatten the two bows 24 completely with the assurance that such tightening of the nut will result in the desired predetermined expansion of the split ring without any danger of exceeding that degree of expansion.

The fact that the split ring has less resistance to outward flexure in the region of the two ends 15 causes these two ends to be more responsive to the applied expansion force than the rest of the ring, so that the ring initially expands primarily on the diameter 44 to bring the ring into initial pressure contact with the surrounding tank shell on that diameter. This initial expansion on the diameter 44 forces the two arcuate plate flanges 40 outward against the tank shell to cooperate with the tank shell for the prevention of local twisting or local rotation of the expanding ring in the region of the ring ends 15.

Figure 4 shows an internal reinforcement frame or structure comprising two split rings R. The two split rings are interconnected by an upper longitudinal beam 50 in the form of a pair of channel members joined back-to-back to form a rigid beam structure. When this internal reinforcement structure is used in a jettisonable fuel tank, the longitudinal beam 50 receives the force for ejecting the empty fuel tank away from the aircraft and the beam 50 distributes this force to the two rings R. Usually a second longitudinal beam positioned diametrically opposite from the longitudinal beam 50 is required to interconnect the regions of the splits of the two rings to keep the rings from twisting in these regions in response to the applied expansion force. Such a second longitudinal beam is omitted in the construction shown in Figure 4, however, because, as heretofore explained, each of the two rings R is provided with a pair of arcuate flanges 40 that serve the purpose of keeping the rings from twisting.

From the foregoing it is apparent that an internal reinforcement structure comprising or including such a split ring R may be readily assembled to a tank shell in the fabrication of a tank in the field and that the assembly operation may be performed with readily available conventional wrenches without requiring any special additional equipment. It is further apparent that when such a split ring is installed in a tank it forms a rigid, continuous load-carrying member, since tightening the screw means brings the two pressure members snug against the flattened plates 18 and 20 to form a rigid connection across the gap between the two ends of the split ring.

My description in specific detail of the selected embodiment of the invention will suggest various changes, modifications and other departures from my disclosure that properly lie within the spirit and scope of the appended claims. For example, the invention is not limited to two bowed plates as distinguished from a single bowed plate and in its broader aspect is not restricted to the use of a screw means for straightening a bowed plate to cause expansion of the split ring.

I claim:

1. An internal reinforcement structure for a tank shell, including: a reinforcement ring split to form two adjacent ends and to permit the ring ends to be spread apart from an initial spacing to a larger spacing thereby to increase the diametrical dimension of the ring from a dimension small enough to permit the ring to be inserted into the tank shell to a larger diametrical dimension for internal reinforcement of the shell; and a pair of plates mounted on opposite sides respectively, of said ring, said plates having intermediate portions bowed laterally away from each other, each of said plates having its opposite ends connected to said two ring ends respectively with said ring ends at said initial spacing whereby said bowed portions of the plates may be flattened towards each other to expand the split ring to said given larger diametrical dimension.

2. A combination as set forth in claim 1 in which said two plates are substantially flat at said given larger diametrical dimension of the ring.

3. A combination as set forth in claim 1 which includes screw means to flatten said bowed portions of both of said plates simultaneously.

4. An internal reinforcement structure for a tank shell, including: a reinforcement ring split to form adjacent ends to permit the ends to be spread apart from an initial spacing to a larger spacing for expansion of the ring from an initial diametrical dimension small enough to permit the ring to be inserted into said shell to a larger diametrical dimension for internal reinforcement of the shell; and at least one plate extending across the split of the ring and connected to the two ends of the ring with said two ends at said initial spacing, said plate having an intermediate bowed portion whereby the ring may be inserted in the tank shell and then said bowed portion of the plate may be flattened to expand the ring to said larger diametrical dimension, said reinforcement ring having an outer circumferential flange extending in one direction laterally of the ring for contact with the tank shell, said ring also being provided with additional flanges on opposite sides of the split of the ring on the same circumstance as said ring flange, said additional flanges extending in the opposite direction laterally of the ring to stabilize the ring against lateral rotation at its split ends in response to the expansion force created by straightening said bowed portion of the plate.

5. A combination as set forth in claim 4 in which said additional flanges are integral parts of said bowed plate.

6. An internal reinforcement structure for a tank shell, including: a reinforcement ring split to form adjacent ends to permit the ends to be spread apart from an initial spacing to a larger spacing for expansion of the ring from an initial diametrical dimension small enough to permit the ring to be inserted into said shell to a larger diametrical dimension for internal reinforcement of the shell; and at least one plate extending across the split of the ring and connected to the two ends of the ring with said two ends at said initial spacing, said plate having an intermediate bowed portion whereby the ring may be inserted in the tank shell and then said bowed portion of the plate may be flattened to expand the ring to said larger diametrical dimension, said ring having a radial web that is crescent-shaped in general configuration with the greatest radial dimension of the web in the mid-region diametrically opposite from the split of the ring so that the greatest outward flexure of the ring in response to the spreading of the two ends of the ring is in the region of the two ends.

7. An internal reinforcement structure for a tank shell, including: a reinforcement ring split to form two adjacent ends and to permit the ring ends to be spread apart from an initial spacing to a larger spacing thereby to increase the diametrical dimension of the ring from a dimension small enough to permit the ring to be inserted into the tank shell to a larger diametrical dimension for internal reinforcement of the shell; a pair of plates each of which has its opposite ends connected to said two ring ends respectively, with said ring ends at said initial spacing, the intermediate portions of said two plates being positioned face-to-face and oppositely bowed to form a generally elliptical space between the two plates whereby said bowed portions of the plates may be flattened towards each other to expand the split ring to said given larger diametrical dimension; and screw means spanning said elliptical space to act in tension for applying straightening force to said bowed portions of the two plates.

8. A combination as set forth in claim 7 in which said bowed portions have aligned apertures therein; and in which said screw means extends through said aligned apertures.

9. A combination as set forth in claim 8 which includes two pressure members positioned respectively on the outer sides of said bowed portions of the two plates, said pressure members having apertures aligned with the apertures in the bowed portions of the plates; and in which said screw means extends through the apertures of said pressure members to draw two pressure members towards each other for applying the straightening force.

10. An internal reinforcement structure for a tank shell, including: a reinforcement ring split to form two adjacent ends and to permit the ring ends to be spread apart from an initial spacing to a larger spacing thereby to increase the diametrical dimension of the ring from a dimension small enough to permit the ring to be inserted into the tank shell to a larger diametrical dimension for internal reinforcement of the shell; and a pair of plates having oppositely bowed intermediate portions, each of said plates having its opposite ends connected to said two ring ends respectively with said ring ends at said initial spacing whereby said bowed portions of the plates may be flattened to expand the split ring to said given larger diametrical dimension, said ring having an outer circumferential flange extending laterally in one direction from the ring, one of said two plates having flanges on opposite sides of the split of the ring on the same circumference as said ring flange and extending laterally in the opposite direction to stabilize the ring against local lateral rotation at its split ends in response to the expansion force created by flattening said plates.

References Cited in the file of this patent

UNITED STATES PATENTS

| 1,179,188 | Kanty et al. | Apr. 11, 1916 |
| 2,164,660 | Miller | July 4, 1939 |
| 2,462,721 | Cohen | Feb. 22, 1949 |
| 2,616,587 | Petch | Nov. 4, 1952 |

FOREIGN PATENTS

| 23,619 | Netherlands | June 15, 1931 |

UNITED STATES PATENT OFFICE

CERTIFICATE OF CORRECTION

Patent No. 2,813,655　　　　　　　　　　　　　　　　　November 19, 1957

Carl E. Hall

It is hereby certified that error appears in the printed specification of the above numbered patent requiring correction and that the said Letters Patent should read as corrected below.

Column 5, line 50, for "circumstance" read --circumference--.

Signed and sealed this 21st day of January 1958.

(SEAL)
Attest:

KARL H. AXLINE
Attesting Officer

ROBERT C. WATSON
Commissioner of Patents